United States Patent

Gay

[15] 3,683,334

[45] Aug. 8, 1972

[54] DIGITAL RECORDER

[72] Inventor: Leslie W. Gay, Palos Verdes Peninsula, Calif.

[73] Assignee: The National Cash Register Company, Dayton, Ohio

[22] Filed: Nov. 19, 1970

[21] Appl. No.: 91,123

[52] U.S. Cl.....340/172.5, 340/174.1 A, 340/174.1 H

[51] Int. Cl............................G06f 3/06, G11b 23/18

[58] Field of Search.....340/172.5, 174.1 A, 174.1 G, 340/174.1 H

[56] References Cited

UNITED STATES PATENTS

| | | |
|---|---|---|
| 2,813,259 | 11/1957 | Burkhart................340/174.1 |
| 3,569,942 | 3/1971 | Larsen et al...........340/172.5 |
| 3,417,377 | 12/1968 | Vietor et al............340/172.5 |
| 2,853,357 | 9/1958 | Barber................340/174.1 X |
| 3,281,804 | 10/1966 | Dirks......................340/174.1 |
| 3,217,329 | 11/1965 | Gabor.....................340/174.1 |
| 3,320,598 | 5/1967 | Star........................340/174.1 |
| 3,562,726 | 2/1971 | Hamilton................340/174.1 |

*Primary Examiner*—Paul J. Henon
*Assistant Examiner*—Sydney R. Chirlin
*Attorney*—Louis A. Kline and Joseph R. Dwyer

[57] ABSTRACT

In accordance with the present invention, pulses representing binary "ones", and pulses representing binary "zeros" are recorded on a "ones" track and a "zeros" track, respectively, of a tape cassette. The reproducing unit recombines the "ones" and "zeros", storing the bits in a shift register until a complete word is stored in the shift register. The "one" and "zero" pulses are also combined to provide clock pulses synchronized with the data pulses.

9 Claims, 3 Drawing Figures

INVENTOR
LESLIE W. GAY
Louis A Kline
BY Joseph Dwyer
HIS ATTORNEYS

INVENTOR
LESLIE W. GAY
Louis A. Kline
BY Joseph R. Dwyer
HIS ATTORNEYS

DIGITAL RECORDER

BACKGROUND

The present invention relates to the recording and recovery of data, and more particularly to the magnetic recording and recovery of digital data independently of speed fluctuations of the recording medium.

Special digital magnetic tape is used to record information passed to it by data processing equipment, and at a later time reproduces the data, passing it back to the requesting data processing equipment. Data may be passed back and forth between the storage devices and source or destination equipment in discrete form as binary information digits, or bits.

Heretofore, half-inch tape, 2,400 feet long, wound on reels has been the standard magnetic tape configuration employed to record information in data processing equipment. The reels carrying such one-half inch wide, 2,400 foot tapes are heavy, having a considerable amount of inertia. As a result, repeated reversal of direction of motion of the tape required to search for and locate particular items of information is difficult and time consuming. Relatively heavy duty precision tape drives are required. Therefore, reel-to-reel tapes are generally used for long-term, bulk storage where quick access to a particular piece of data is not essential.

In contrast to bulky reels, compact cassettes carrying up to 300 feet of ⅛-inch tape have been introduced as a compromise between the reels of tape discussed above and instantaneous random access memories. The cassettes are extremely compact and are low in cost in comparison with reel-to-reel tapes. The handling equipment for cassettes is simpler, considerably more compact, and less expensive than the equipment for handling the large tape reels. Normally, the cassettes record data on, and read from, two tape tracks as contrasted with the eight tracks which are usual on the ½-inch tape reels. Access time for a particular bit of data on the cassette may be on the order of 5 seconds as compared with the one minute average access time for a particular bit on the 2,400 foot reel.

However, cassette recorders are subject to large and uneven variations in speed, limiting their usefulness. These fluctuations in speed are detrimental to reliable recording and playback of digital data.

SUMMARY OF THE INVENTION

The present invention employs the recorded signal to develop a clock signal, resulting in a self-clocking system. Thus, reliable information can be recovered from the tape completely independent of speed fluctuations within the cassette recorder during recording or playback. Although the present invention is particularly adapted for use in connection with cassette recorders, enabling use in it may be employed in connection with any type of digital magnetic recording system which may be susceptible to variations in speed thereby enabling the use of lower priced equipment having wider tolerances.

In accordance with the present invention, pulses representing binary "ones", and pulses representing binary "zeros" are recorded on a "ones" track and a "-zeros" track, respectively, of a tape cassette. The reproducing unit recombines the "ones" and "zeros", storing the bits in a shift register until a complete word is stored in the shift register. The "one" and "zero" pulses are also combined to provide clock pulses synchronized with the data pulses.

It is, therefore, an object of the present invention to provide a means for magnetically recording and reproducing digital data which is immuned to variations in speed of the magnetic medium.

Another object of the present invention is to provide binary digital magnetic recording and reproducing means which are low in cost, reliable, and simple to use.

Other objects and features of the invention will become apparent to those skilled in the art from the following detailed description of a preferred embodiment of the present invention as illustrated in the accompanying drawings wherein:

DESCRIPTION

Figure 1:
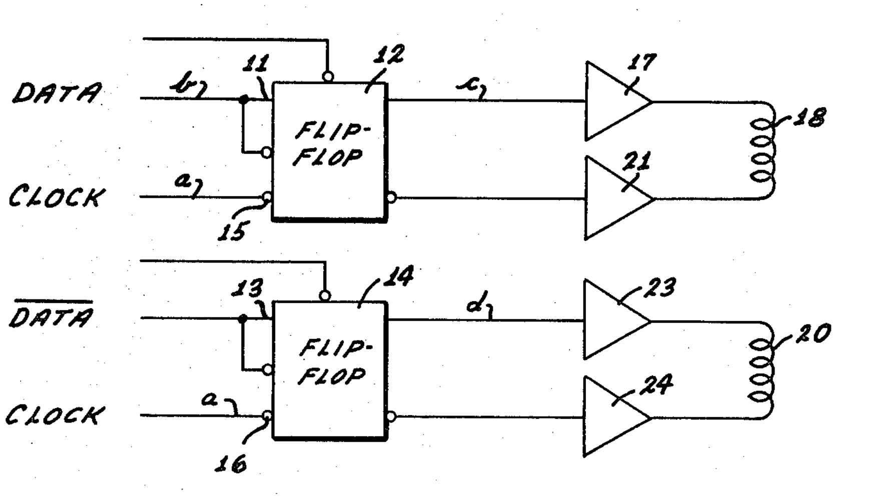
FIG. 1 is a block diagram of the recording means of the present invention.

Referring now to FIG. 1 of the drawings, the binary digital input data to be recorded is applied to the data input terminal 11 of flip-flop 12. The reciprocal of the binary data is applied to reciprocal input terminal 13 of flip-flop 14. Clock pulses from a suitable clock pulse source are also applied to clock inputs 15 and 16 of flip-flops 12 and 14 respectively. The clock signal is a square wave illustrated by FIG. $3_a$. Flip-flop 12 provides an output pulse to a suitable magnetic tape recording head coil 18 through driver amplifiers 17 and 21 for each binary "one" appearing at the data input. Similarly, flip-flop 14 applies a pulse to a magnetic recording head coil 20 through driver amplifiers 23 and 24 upon application of a "zero" digit to terminal 13 of flip-flop 14 by the reciprocal of the data signal. The "one" and "zero" pulses are synchronized by the by signal.

The "one" signal is illustrated at FIG. $3_c$ and the "-zero" signal is illustrated at FIG. $3_d$. It will be apparent, therefore, that all of the "ones" in the original data signal, FIG. $3_b$, are recorded on one track of the magnetic tape cassette, and all of the "zeros" in the data signal are recorded on the other track of the tape cassette.

Figure 2:
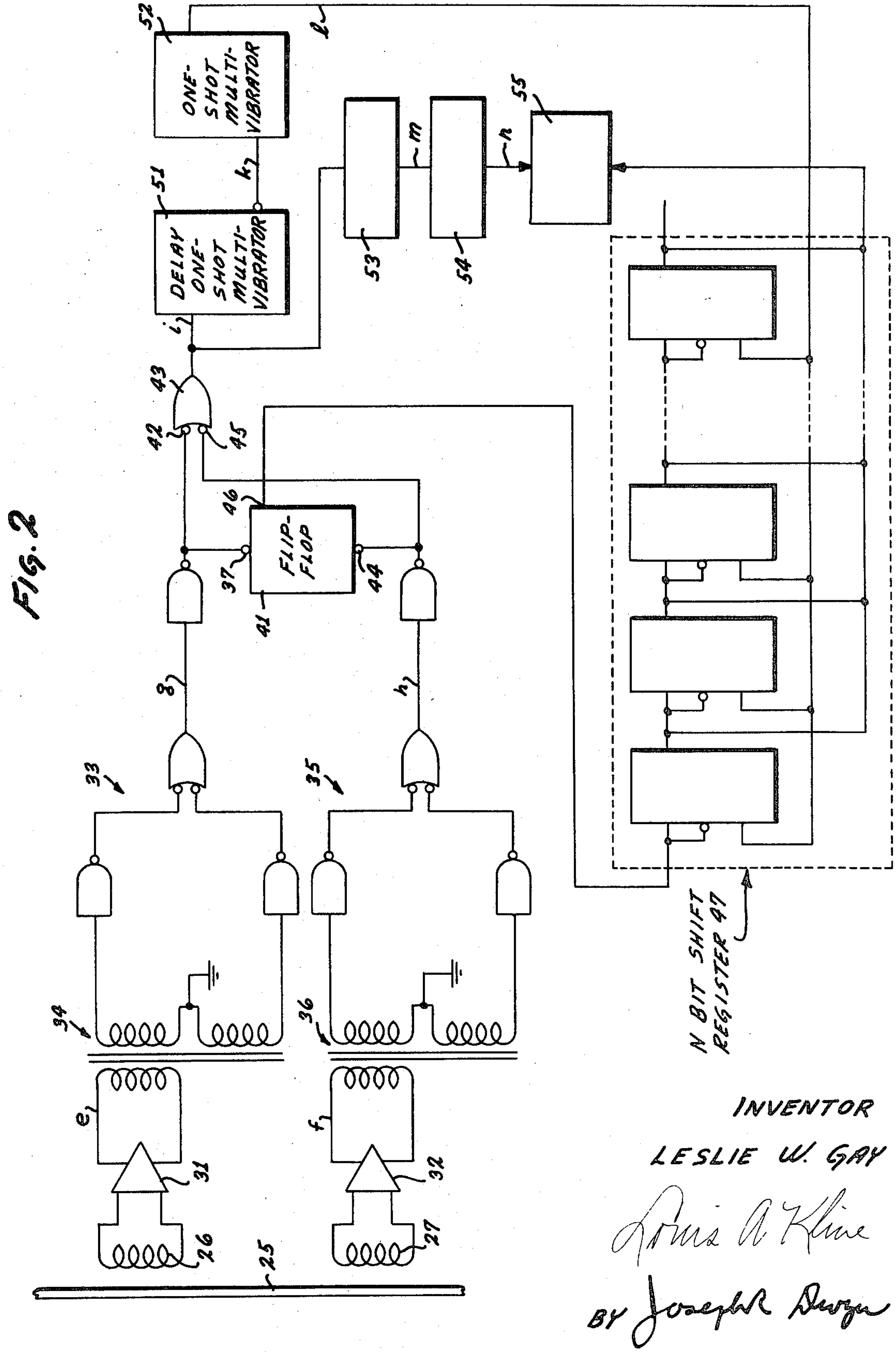
FIG. 2 is a block diagram of the playback and data recovery means of the present invention; and, FIG. 3 illustrates waveforms present in various places in the present invention.

Referring now to FIG. 2, the recorded cassette tape 25 is drawn past reproducing heads 26 and 27. Head 26 is positioned to read the track upon which the binary "ones" were recorded, and head 27 is positioned to read the track which the binary "zeros" were recorded. Differential amplifiers 31 and 32 amplify the "ones" signals from playback head 26, and the "zeros" signals from playback head 27, respectively. The amplified "ones" signal, illustrated in FIG. $3_e$, is applied to full wave rectifier 33 through pulse transformer 34. Similarly, the "zeros" signals from amplifier 32 are applied to full wave rectifier 35 through pulse transformer 36. The resultant unidirectional "ones" pulses are applied to terminal 37 of flip-flop 41, and to terminal 42 of "OR" circuit 43. In a similar manner, the unidirectional "zero" pulses are amplified and applied to terminal 44 of flip-flop 41, and to terminal 45 of "OR" circuit 43. The "ones" pulses and "zeros" pulses applied to terminals 37 and 44, respectively, of flip-flop 41, are combined therein to provide the original data waveform, as illustrated in FIG. $3_b$, at output terminal 46. The recovered data is applied to a suitable shift register 47, having a capacity equal to the number of bits in the binary word.

Figure 3:
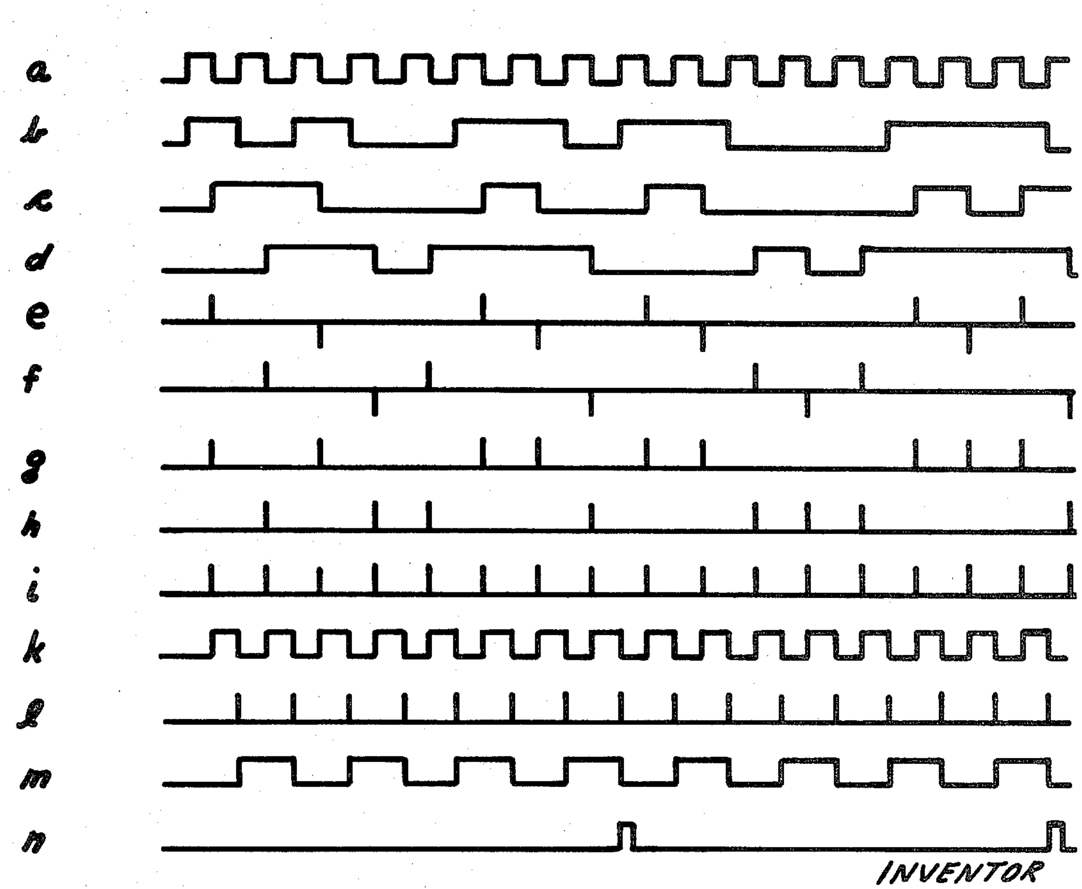

Returning to the "OR" circuit 43, the output signal therefrom, illustrated at FIG. $3_i$, is applied to a delay one-shot multivibrator 51. The square wave output of the delay one-shot multivibrator is applied to shift clock 52. Illustrated in FIG. $3_l$ is the output shift clock 52, a series of pulses delayed one-half bit time. These pulses are applied to shift register 47 together with the recovered data from flip-flop 44. As a result, each data bit is shifted from position to position in the shift register until the complete binary word is stored in the shift register. Upon storage of the complete word in shift register 47, it is necessary to provide a signal indicating that the complete word has been stored and may be read out. This signal is supplied by the sum clock pulses from "OR" circuit 43 applied to an n-stage counter 53. As will be apparent, each digital pulse, representing both "ones" and "zeros", is applied to counter 53. Upon receipt of the *n*th pulse, a word transfer pulse is generated by a suitable decode circuit 54 when counter 53 is full. An eight bit word, or byte, is illustrated in FIG. 3. Generation of the word transfer pulse, FIG. $3_n$, causes a suitable utilization circuit 55 to read out the word stored in the shift register 47 and reset the shift register and counter. Since the shift register transfer pulses are generated by the same signals as those providing the recovered data, variations in speed of the recording medium cannot cause any errors in the word read into the shift register. Further, variations in speed of recording medium cannot cause any errors in the reading out of the word from the shift register.

What is claimed is:

1. A data recording and reproducing system comprising:
   - dual track digital data recording means for placing one type of digit on one track and another type of digit on a second track;
   - first reproducing means for reading the signal on said first track;
   - second reproducing means for reading the signal on said second track;
   - first means for combining said signals read from said first and second tracks to recover said digital data including first and second rectifier means in circuit with said first and second reproducing means respectively, and a flip flop having first and second inputs connected to said first and second rectifier means respectively;
   - second means for combining said signals read form said first and second tracks including an "OR" gate connected to said first and second rectifier means for recovering a control signal synchronized with said digital data; and,
   - converting means for converting said digital data from serial to parallel form.

2. The invention in accordance with claim 1 wherein said recording means includes first means responsive to a rectangular waveform data signal and a rectangular waveform clock signal and second means responsive to the reciprocal of said rectangular waveform data signal and said rectangular waveform clock signal to generate binary one signals on a first recording line and binary zero signals on a second recording line.

3. The invention in accordance with claim 1 wherein said first and second reproducing means include first and second reproducing heads cooperating with said first and second tracks respectively, "ones" pulse recovery means connected to said first reproducing heads including a first rectifier to provide unidirectional "ones" pulses, and "zero" pulse recovery means connected to said second reproducing head including a second rectifier to provide unidirectional "zero" pulses.

4. The invention in accordance with claim 1 wherein said converting means includes shift register means connected to the output terminal of said flip flop for storing said recovered digital data, said shift register means having a capacity equal to the word length of said digital data, control means including a counter connected to said "OR" gate for counting a predetermined number of binary bits equal to the capacity of said shift register and producing a control signal, and means for applying said control signal to said shift register to read out said binary data.

5. The invention in accordance with claim 4 wherein shift pulses are applied to said shift register by a one-shot multivibrator in circuit with said "OR" gate.

6. A binary digital data recording and reproducing system comprising:
   - first recording means for magnetically recording binary "ones" on a first track;
   - second recording means for magnetically recording binary "zeros" on a second track;
   - first reproducing means for reading signals on said first track;
   - second reproducing means for reading signals on said second track;
   - first pulse recovery mans connected to said first reproducing means recovering "ones" pulses in response to "ones" recorded on said first track;
   - second pulse recovery means connected to said second reproducing means for recovering "zeros" pulses in response to "zeros" recorded on said second track;
   - first combining means including first and second rectifier means connected to said first and second pulse recovery means and a flip flop in circuit with said first and second rectifier means for combining said "one" and "zero" pulses to reproduce recorded binary digital data;
   - second combining means including an "OR" gate connected to said first and second rectifier means for combining said pulses to provide a control signal synchronized with said binary digital data; and,
   - converting means for converting said binary digital data from serial to parallel form.

7. The invention in accordance with claim 6 wherein said first recording means includes first means responsive to a rectangular waveform data signal and a rectangular waveform clock signal, and said second recording means includes second means responsive to the reciprocal of said rectangular waveform data signal and said rectangular waveform clock signal to generate binary one signals on a first recording line and binary zero signals on a second recording line.

8. The invention in accordance with claim 7 wherein said converting means includes shift register means connected to said first combining means for storing said recovered digital data, said shift register means having a capacity equal to the word length of said digital data, decoding means including a counter connected to said "OR" gate for converting a predetermined member of binary bits equal to the capacity of said shift register to produce a control signal, and means for applying said control signal to said register to read out said binary data.

9. The invention in accordance with claim 8 wherein a one-shot multivibrator is connected to said "OR" gate and to said shift register to provide shift pulses to said shift register.

* * * * *